United States Patent
Lee et al.

(10) Patent No.: US 8,831,226 B2
(45) Date of Patent: Sep. 9, 2014

(54) METHOD FOR KEY UPDATE BASED ON THE AMOUNT OF COMMUNICATION IN WIRELESS SENSOR NETWORKS HAVING HIERARCHY STRUCTURE

(75) Inventors: Saewoom Lee, Gwangju (KR); Kiseon Kim, Gwangju (KR); Jeehoon Lee, Gwangju (KR); Yoondong Sung, Gwangju (KR)

(73) Assignee: Gwangju Institute of Science and Technology, Buk-Gu, Gwangju (KR)

( * ) Notice: Subject to any disclaimer, the term of this patent is extended or adjusted under 35 U.S.C. 154(b) by 113 days.

(21) Appl. No.: 13/295,768

(22) Filed: Nov. 14, 2011

(65) Prior Publication Data

US 2012/0140926 A1    Jun. 7, 2012

(30) Foreign Application Priority Data

Dec. 6, 2010  (KR) .................. 10-2010-0123759

(51) Int. Cl.
   H04L 29/06      (2006.01)
   H04L 9/08       (2006.01)
   H04W 12/04      (2009.01)
   H04L 29/08      (2006.01)

(52) U.S. Cl.
   CPC ........... *H04L 63/064* (2013.01); *H04L 9/0891* (2013.01); *H04W 12/04* (2013.01); *H04L 2209/805* (2013.01); *H04L 67/12* (2013.01); *H04L 63/105* (2013.01); *H04L 63/102* (2013.01); *H04L 9/0869* (2013.01)
   USPC ........... 380/277; 380/270; 380/255; 380/258; 713/163; 713/171; 713/189

(58) Field of Classification Search
   CPC .......................... H04L 63/102; H04L 63/105
   USPC ............ 380/255–276, 277, 44; 713/150–194
   See application file for complete search history.

(56) References Cited

U.S. PATENT DOCUMENTS

| | | | |
|---|---|---|---|
| 2005/0117743 A1* | 6/2005 | Bender et al. | 380/28 |
| 2006/0215588 A1* | 9/2006 | Yoon | 370/310 |
| 2009/0323964 A1* | 12/2009 | Park et al. | 380/277 |
| 2010/0293378 A1* | 11/2010 | Xiao et al. | 713/168 |
| 2011/0055549 A1* | 3/2011 | Ei Khayat et al. | 713/150 |
| 2011/0103583 A1* | 5/2011 | Yoon et al. | 380/255 |

\* cited by examiner

*Primary Examiner* — Chau Le
*Assistant Examiner* — Don Zhao
(74) *Attorney, Agent, or Firm* — Nath, Goldberg & Meyer; Jerald L. Meyer; Stanley N. Protigal

(57) ABSTRACT

The present invention relates to a key update method based on the amount of communication in wireless sensor networks having a hierarchy structure.

14 Claims, 4 Drawing Sheets

METHOD FOR KEY UPDATE BASED ON THE AMOUNT OF COMMUNICATION IN WIRELESS SENSOR NETWORKS HAVING HIERARCHY STRUCTURE

CROSS-REFERENCE TO RELATED APPLICATION

This application claims under 35 U.S.C. §119(a) the benefit of Korean Patent Application No. 10-2010-0123759 filed on Dec. 6, 2010, the entire content of which is incorporated herein by reference.

BACKGROUND (a) Technical Field

The present invention relates to a key update method based on the amount of communication in wireless sensor networks having a hierarchy structure.

(b) Background Art

A wireless sensor network is configured to include a large number of sensors, wherein each sensor senses a predetermined area and information sensed by the sensors is transmitted to manager nodes managing all the information through a predetermined path. In this case, the hierarchy is formed between the nodes to transmit the information to the manager nodes. As described above, the related art for efficiently managing keys in the wireless sensor network having the hierarchy structure generally uses key pre-distributing methods using keys put in the nodes prior to distributing the nodes.

An example of the key pre-distributing methods may include a key management method based on key pre-distribution. In the method, each node has keys corresponding to predetermined numbers prior to being distributed. After the nodes are distributed, each node uses commonly distributed keys to generate keys that can communicate with adjacent nodes. When the commonly distributed keys are not present between any two nodes, theses nodes use commonly distributed keys of adjacent nodes to generate keys that can indirectly communicate with the adjacent nodes.

However, the method may cause any problems when the sensor are captured by an attacker, because the number of commonly distributed keys is set to be one so that the commonly distributed key may not be used for communication. In order to solve the problems, a method for generating keys to be used for communication only when the commonly distributed keys are q (>1) or more has been proposed.

Meanwhile, it can be appreciated that another key pre-distributing method may reduce the number of available pre-distributed keys when a key pre-distributing server knows an area in which nodes are distributed. According to the method, the key pre-distributing server divides the area in which the nodes are distributed into several small areas and distributing some keys to key pools in each area, such that the small areas may share more common keys. As a result, even though the number of pre-distributed keys to be used by the nodes is reduced, two adjacent nodes may easily search the common keys.

Meanwhile, as yet another key pre-distributing method, a key pre-distributing method using sensors distributed in a group has been proposed. Since the sensors belonging to the same group are closely disposed to one another, the possibility that the keys distributed to each node by the key pre-distributing server are common keys to one another has increased. When the adjacent nodes belong to other groups, the nodes serve as an inter-group gateway so as to help forming path keys between the nodes belonging to several other groups.

In the wireless sensor network having the hierarchy structure, a need exists for a new method for effectively managing keys to be used by the sensors. The wireless sensor network for the hierarchy structure participates in communication by generating symmetrical keys for security. In this case, the wireless sensor network having the hierarchy structure can obtain information regarding the used symmetrical keys when the nodes are captured by attackers, thereby causing problems in network security. In addition, when communication with the nodes at which a large amount of communication is present is performed, the exposure of keys may be increased due to frequent communication. Therefore, a need exists for a method for effectively updating keys.

SUMMARY OF THE DISCLOSURE

According to an exemplary embodiment of the present invention, there is provided a method for updating keys used for inter-node information transmission in a network environment including a manger node, a representative node, and a plurality of general nodes, the method for updating keys including: performing first communication between the representative node and the general nodes and performing second communication between the manager node and the representative node; generating random numbers for the manager node, the representative node, and the general nodes, respectively, and generating each symmetrical key based on the random numbers; calculating a first key update value according to the first communication by the general node and updating a first symmetrical key used for the first communication when the first key update value is changed; calculating a second key update value according to the second communication by the representative node and updating a second symmetrical key used for the second communication when the second key update value is changed; performing the first communication or the second communication using the updated first symmetrical key or second symmetrical key.

According to an exemplary embodiment of the present invention, there is provided a method for updating keys used for an inter-node information transmission in a network environment including a representative node and a plurality of general nodes, the method for updating keys including: generating random numbers the representative node and the general nodes, respectively; transmitting a coupling signal for managing the general nodes as the member node of the representative node; generating a temporary key for the general nodes transmitting the coupling signal by the representative node and transmitting the generated temporary key to the general nodes, by including the generated temporary key in scheduling information; calculating a symmetrical key from the temporary key and calculating a key update value for transmitting data to the representative node by the general nodes receiving the scheduling information including the temporary key; and updating the calculating symmetrical key and transmitting data to the representative node using the updated symmetrical key by the general node when the key update value is changed.

According to an exemplary embodiment of the present invention, there is provided a method for updating keys used for an inter-node information transmission in a network environment including a representative node and a manager node, the method for updating keys including: generating random numbers the representative node and the manager node, respectively; transmitting the representative node selection information to the manager node by the representative node, including the ID information and the generated random number; generating the temporary key for the representative node and transmitting the generated temporary key to the representative node based on the random number of the representative node included in the representative node selection information by the manager node; calculating the symmetrical key from the temporary key and calculating the key updating value for transmitting data to the manager node; and calculating the calculated symmetry key and transmitting the data to the manager node using the updated symmetrical key by the representative node when the key update value is changed.

BRIEF DESCRIPTION OF THE DRAWINGS

The above and other features of the present invention will now be described in detail with reference to certain preferred embodiments thereof illustrated in the accompanying drawings which are given hereinbelow by way of illustration only, and thus are not limitative of the present invention, and wherein.

DETAILED DESCRIPTION

Hereinafter reference will now be made in detail to various embodiments of the present invention, examples of which are illustrated in the accompanying drawings and described below. While the invention will be described in conjunction with preferred embodiments, it will be understood that the present description is not intended to limit the invention to those preferred embodiments. On the contrary, the invention is intended to cover not only the preferred embodiments, but also various alternatives, modifications, equivalents and other embodiments, which may be included within the spirit and scope of the invention as defined by the appended claims.

A method for updating keys according to the amount of communication in wireless sensor networks having a hierarchy structure according to an exemplary embodiment of the present invention will be described with reference to the accompanying drawings.

Figure 1:
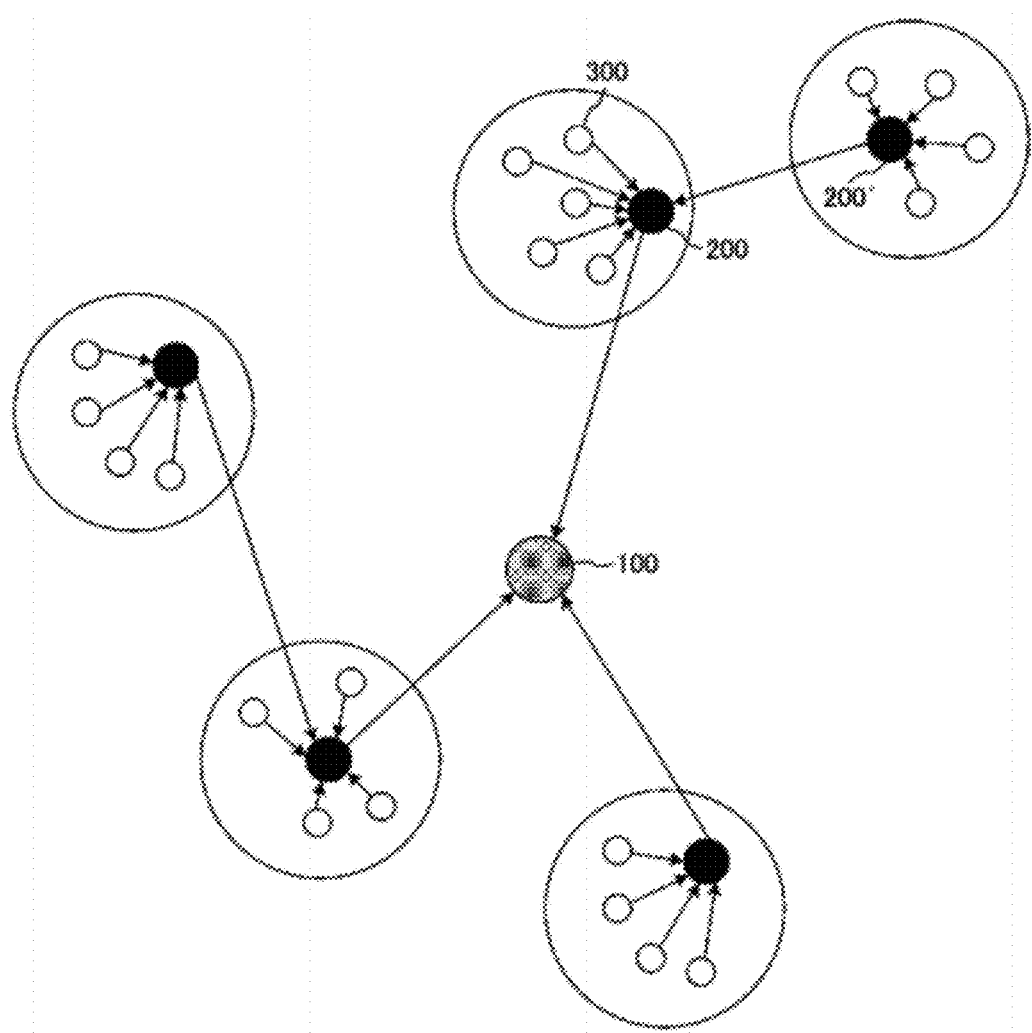
FIG. 1 is an exemplified diagram of wireless sensor networks having a hierarchy structure according to an exemplary embodiment of the present invention.

FIG. 1 is an exemplified diagram of wireless sensor networks having a hierarchy structure according to an exemplary embodiment of the present invention.

As shown in FIG. 1, in the wireless sensor networks having the hierarchy structure, general nodes 300 are first disposed so as to transmit information by forming a hierarchy in the wireless sensor networks having the hierarchy structure and then, manager nodes 100 are set as a group. One of the general nodes 200 belonging to the set group is selected by the manager node 100 and serves as representative node 200 and 200' of the corresponding group. In this case, a method for setting the manager nodes 100 as a group or selecting the representative nodes 200 and 200' is known in advance and therefore, the detailed description thereof will be omitted in the exemplary embodiment of the present invention.

A role of the representative nodes 200 and 200' integrates information in the group and transmits the integrated information to the manager node 100. In this case, the representative nodes 200 and 200' directly transmit information to the manager node. However, when the representative node 200' may not directly communicate with the manager node 100, the representative node 200' may transmit data to another representative node 200 at a shortest distance from the manger node 100 so that the data may be transferred to the manager node 100.

A symmetrical key generating process and a key update process generated in the wireless networks having the hierarchy structure will be described with reference to FIG. 2.

Figure 2:
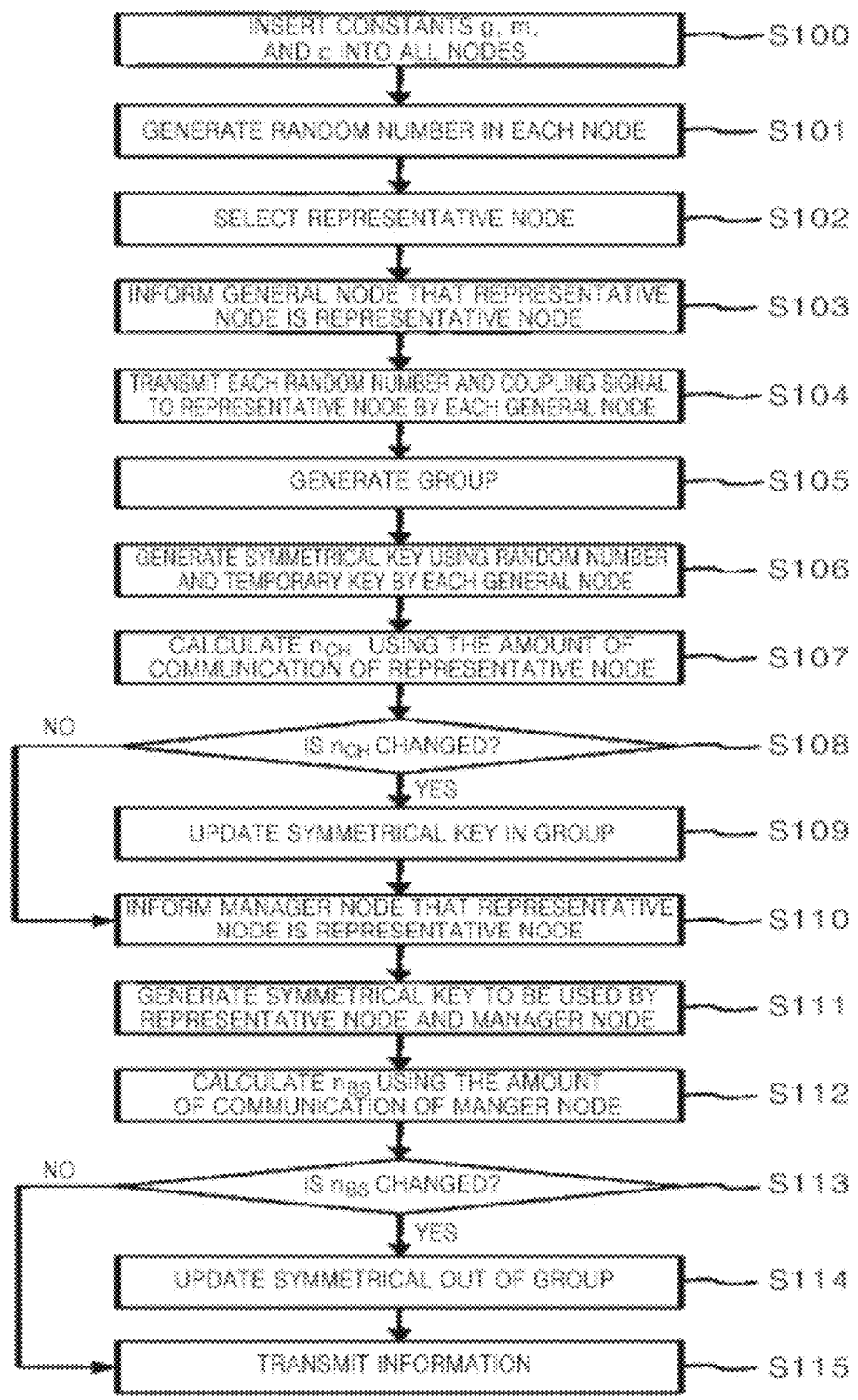
FIG. 2 is a flow chart showing a symmetrical key generating process and a key update process in the wireless sensor networks having the hierarchy structure according to the exemplary embodiment of the present invention.

FIG. 2 is a flow chart showing a symmetrical key generating process and a key update process in the wireless sensor networks having the hierarchy structure according to the exemplary embodiment of the present invention.

Prior to describing FIG. 2, the representative node 200 exchanges each random number with the general node 300 to generate the symmetrical key to be used for communication in a group and uses the amount of communication of the representative node 200 to determine whether the symmetrical keys used for communication in the group are used as they are or the keys are updated. In addition, the exemplary embodiment of the present invention uses the random number of the manager node 100 and the representative node 200 to generate the symmetrical keys to be used for communication out of the group and determine whether the keys used for communication out of the group are updated in consideration of the amount of communication with the manger node 100 or are used as they are, such that the wireless communication networks participate in communication. After the inter-node communication, a process of selecting other representative nodes is generated when a predetermined period lapses and a process of using, updating, or communicating the symmetrical key is repeated.

In the wireless sensor networks having the hierarchy structure according to the exemplary embodiment of the present invention, a method for updating keys uses a method for confirming the amount of communication of the nodes to update the keys when the amount of communication exceeds a predetermined frequency. The method for updating keys is configured by three processes. These processes include generating the symmetrical keys, updating the keys of communication in the group, and updating the keys of communication out of the group by using the random number generated by each node. Each node maintains or updates keys through three processes so as to participate in communication.

The first process, that is, the generating of the symmetrical key using the random number corresponds to generating the symmetrical key to be used for communication in the group and communication out of the group in the wireless sensor network having the hierarchy structure. Before the nodes are disposed, constants g, m, and c are inserted into all the nodes (S100). The constants are used to generate the symmetrical keys and update the keys.

When the nodes into which the constants are inserted are disposed, each node generates the random number to be used. In this case, a method for generating a random number is known in advance and therefore, the detailed description thereof will be omitted in the exemplary embodiment of the present invention.

When all the nodes generate the random number, the manager node 100 selects the representative node 200 (S102). The node selected as the representative node 200 informs the adjacent nodes that the selected node 200 is selected as the representative node 200 (S103). Accordingly, the nodes that are set as a member node among the adjacent nodes transmit the coupling messages to the representative nodes so as to generate the group so that the nodes become the member node of the group managed by the representative node 200 (S104 and S105). In this case, determining whether the nodes are the member nodes are known in advance and the detailed description thereof will be described in the exemplary embodiment of the present invention.

In this case, the general node 300 codes random number $r_s$ generated at step S101 together with its own ID and transmits the coded random number to the representative node 200 (S104). The representative node 200 uses the random numbers transmitted from the nodes that are the member to generate a symmetrical key K to be used for communication in the group (S106). The symmetrical key K is generated as $K = g^{r_1 r_2 \cdots r_s r_t \cdots r_n} \mod m$ and n represents the number of member nodes belonging to the group.

Meanwhile, when the representative node 200 generates a temporary key of the general nodes 300, the temporary key is created using the remaining random numbers other than the random number of the general node so as to prevent the random number of other nodes used for the symmetric key from being exposed. For example, a temporary key $K_s$ generated in node s by excluding the random number $r_s$ for a node s is added and transmitted to scheduler information transmitted by the representative node 200 so as to remove communication collision between the member nodes.

Where $K_s$ is calculated as $K_s = g^{r_1 r_2 \cdots r_s r_t \cdots r_n} \mod m$. The node s uses the $r_s$ that is the random number of $K_s$ and S received from the representative node 200 to calculate the symmetrical key K to be used for communication in the group (S106). Meanwhile, the symmetrical key to be used for communication out of the group is also generated using the random number $r_{BS}$ of the manager node and the random number $r_t$ of the representative node by the same manner.

When the symmetrical key using the random number is generated through the first process, the updating of the keys for communication in the group that is the second process is determining whether the symmetrical key used in the communication between the general node 300 and the representative node 200 is used as it is or is updated.

When the symmetrical key for communication in the group is successfully generated at S106, the general node 300 may participate in the communication using the generated key. However, when the communication is continued using a single key, the problem of the key exposure may occur and therefore, determine whether the key is updated in consideration of the amount of communication of the representative node 200 (S108).

The key update may be determined using a key update value $n_{CH}$ in the group (or, referred to as a first key update value), wherein the key update value $n_{CH}$ in the group is calculated as $n_{CH} = [N_{CH}/c]$ (S107). Where $N_{CH}$ represents a frequency performing the communication in the group with the general node 300 and c represents that the key is updated based on how much the amount of communication is.

That is, when the nch exceeds the preset c value, the key update value nch in the group is changed, such that the general node 300 updates its own key like K'=Hk(K) using the hash function (S109). In this case, the hash function is set in advance and therefore, the detailed description thereof will be omitted in the exemplary embodiment of the present invention.

However, if the nch does not exceed the c value and is thus unchanged, the currently used symmetrical key is continuously used. Meanwhile, when the group is reconfigured in consideration of the energy efficiency, the value is initialized and thus, the processes after S100 are again performed.

When the second process is completed by performing the processes up to S109, the updating of the key out of the group performs the determining whether the symmetrical key used in the communication between the representative node 200 and the manager node 100 is used as it is or is updated.

When the symmetrical key for the representative node 200 for communication out of the group is generated, the representative node 200 may participate in communication with the manager node 100 using the generated key. However, it is determined whether the key is updated in consideration of the amount of communication of the manager node in order to previously prevent the problem of the key exposure (S113).

The key update may determine the key update value $n_{BS}$ value out of the group and the update value $n_{BS}$ out of the group (or, referred to as the second key update value) is represented by $n_{BS} = [N_{BS}/c]$ (S112). Where the key update value $n_{BS}$ out of the group represents the frequency performing the communication out of the group between the manager node 100 and the representative node 200 and c represents whether the key is updated based on how much the amount of communication is.

When the $N_{BS}$ exceeds the c value, the key update value out of the group $n_{BS}$ is changed. The representative node 200 updates the key like K'=Hk(K) using the hash function (S114). However, when the $n_{BS}$ does not exceed the c value and thus, the value is not changed, the representative node 200 continuously uses the currently used symmetrical key. Meanwhile, the manager node 100 is continuously maintained until the lifespan of the network comes to an end, the $N_{BS}$ value is not initialized. When the key is updated as described above, each node continues to transmit information using the updated key.

In the wireless sensor network described through FIG. 2, the symmetrical key generating process and the key updating process will be described in detail with reference to FIGS. 3 and 4.

Figure 3:
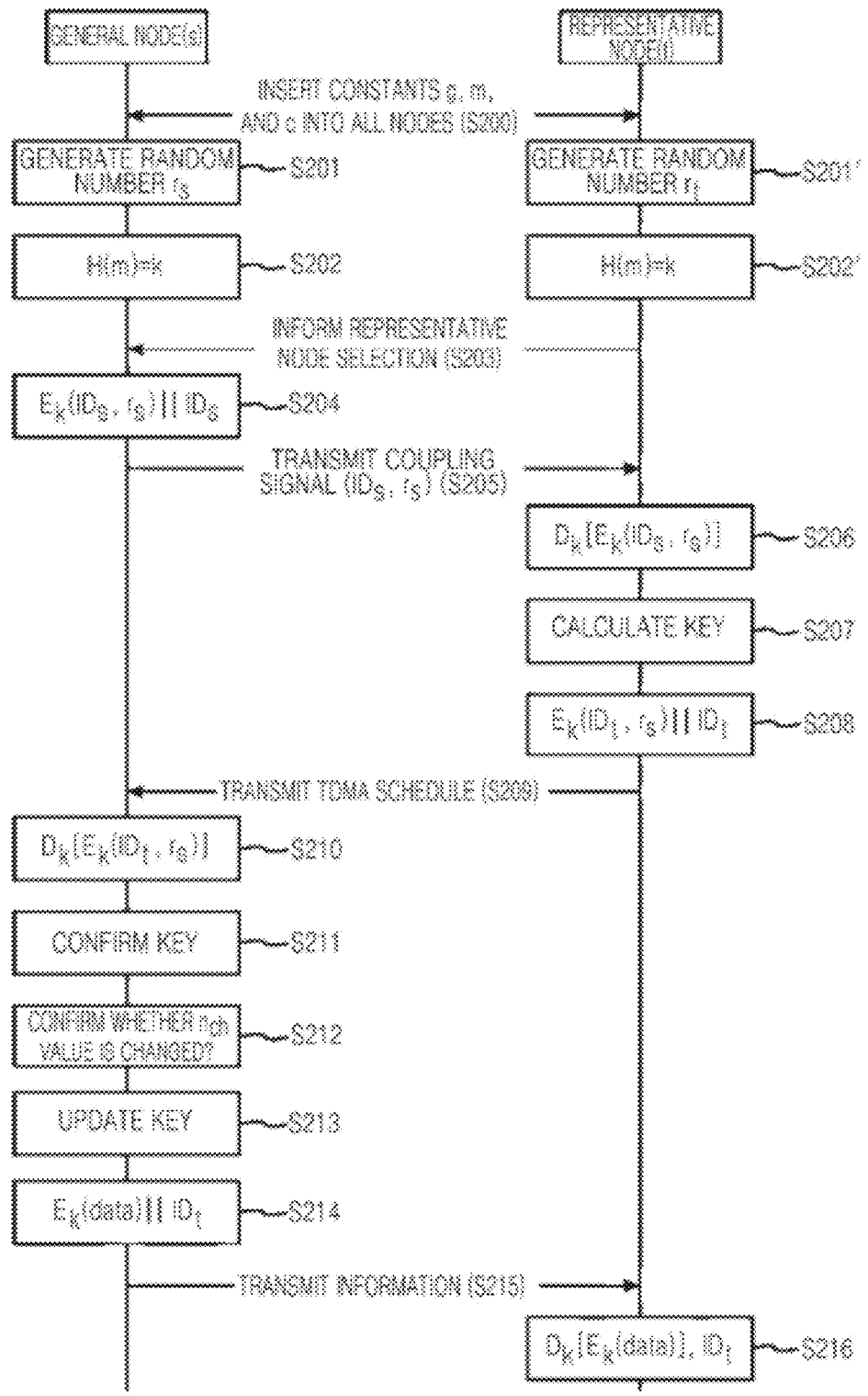
FIG. 3 is a flow chart showing the symmetrical key generating process and the key updating process between general nodes and representative nodes in the wireless sensor networks having the hierarchy structure according to the exemplary embodiment of the present invention.

FIG. 3 is a flow chart showing a symmetrical key generating process and the keys between general nodes and representative nodes in the wireless sensor networks having the hierarchy structure according to the exemplary embodiment of the present invention.

As shown in FIG. 3, in the wireless network having the hierarchy structure according to the exemplary embodiment of the present invention, in order to generate the symmetrical keys and update the keys between the genera node and the representative node, constants g, m, and c are inserted into all the nodes before the nodes are disposed (S200). In this case, g and m are any constant required to generate the keys and c is a constant for a period. These constants are inserted at the time of the system design or each time the system is updated. In this case, the general node is also referred to as the member node s for convenience of explanation.

When all the nodes into which the constants are inserted are distributed, each of all the nodes generates their own random numbers (S201 and S201'). In this case, when the random numbers generated by all the nodes have different values for each node, the method for generating random numbers is known in advance and therefore, the detailed description thereof will be omitted in the exemplary embodiment of the present invention.

Further, the nodes generate the random number exchanging key to be used when the temporary keys are transmitted and received between the nodes (S202 and S202'). In this case the constant m inserted prior to the node distribution is used. The random number exchanging key is generated through H (m)=k and H (•) means the hash function.

When any node is selected by the representative node 200 by the manger node 100, the representative node 200 informs the general nodes 300 that the representative node 200 is the representative node (S203). In this case, a method for allowing the manager nodes 100 to select any node as the representative node is known in advance. The detailed description of the exemplary embodiments of the present invention will be omitted.

When the representative node is selected and informs the adjacent nodes that the selected representative node is a representative node 300, the general nodes 300 transmits the coupling signals to the representative node 200 of the group to which the general nodes 300 want to belong (S205). In this case, the random number of the general node included in the coupling signal is transmitted to the representative node. To this end, the general node codes its own ID information and random number with the random number exchanging key generated at S202 (S204) and is then transmitted to the representative node when the coupling signal is transmitted.

Meanwhile, the representative node 200 prepares a multiple access schedule to be transmitted to the member nodes so as to prevent the representative node from colliding with the general nodes in the group, that is, the member nodes during communication (S209). In this case, the representative node transmits the temporary key for the member node generated by the representative node (S208).

That is, when the representative node 200 receives the ID information of the member and the information of which the random number is coded with the random exchanging key from the member nodes at S205, the random number exchanging key decodes the information to confirm the ID information and each random number of the member nodes (S206). Further, the representative node 200 calculates the temporary key to be transmitted to each member node (300). In this case, the temporary key is generated using the remaining random numbers other than the random numbers of the member node. For example, when all the keys K are formed like $K=g^{r_1 r_2 \cdots r_s r_t \cdots R_n} \mod m$, the key $K_s$ for the member node s is formed through $K_s = g^{r_1 r_2 \cdots r_t \cdots R_n} \mod m$.

At S207, The representative node 200 codes the key $K_s$ for the formed member node and the ID information of the representative node with the random number exchanging key generated at S202' (S208) and the representative node 200 transmits the coded key $K_s$, including a TDMA schedule transmitted to the member nodes of the representative node 200 (S209). At S209, the member node s receiving the TDMA schedule decodes the coded contents included in the schedule with the random number exchanging key (S210) and confirms the ID information of the representative node 200 and the temporary key $K_s$ of the member node s generated by the representative node 200 to detect the symmetrical key K (S211). Therefore, the member node s may perform the communication with the representative node 200 using the symmetrical K detected at S211.

In this case, prior to communication of the member node s with the representative node 200, it is confirmed whether the key update value $n_{CH}$ in the group is changed (S212). In this case, the key update value in the group is calculated like $n_{CH} = [N_{CH}/c]$. Wherein the $N_{CH}$ represents a frequency in which the representative node 200 performs the communication in the group with the member node, c is reference information indicating whether the key is updated based on how much the amount of communication is and is variously changed according to the system design.

When the $n_{CH}$ value is changed, the symmetrical key is updated using the hash function using the symmetrical key (S213) and the nodes participate in communication using the updated symmetrical key. That is, the information including the data and the ID information for the representative node 200 are coded with the updated symmetrical key (S214) and the coded information is transmitted to the representative node 200 (S215). However, when the $n_{CH}$ value is not changed, the currently used symmetrical key is continuously maintained.

At S215, when the information is received from the member node, the representative node 200 decodes the coded information using its own symmetrical key and then, confirms the data in the decoded information (S216).

FIG. 3 shows the symmetrical key generating process and the key updating process between the representative node 200 and the general node, that is, the member node. Meanwhile, the symmetrical key generating process and the key updating process will be described with reference to FIG. 4.

Figure 4:
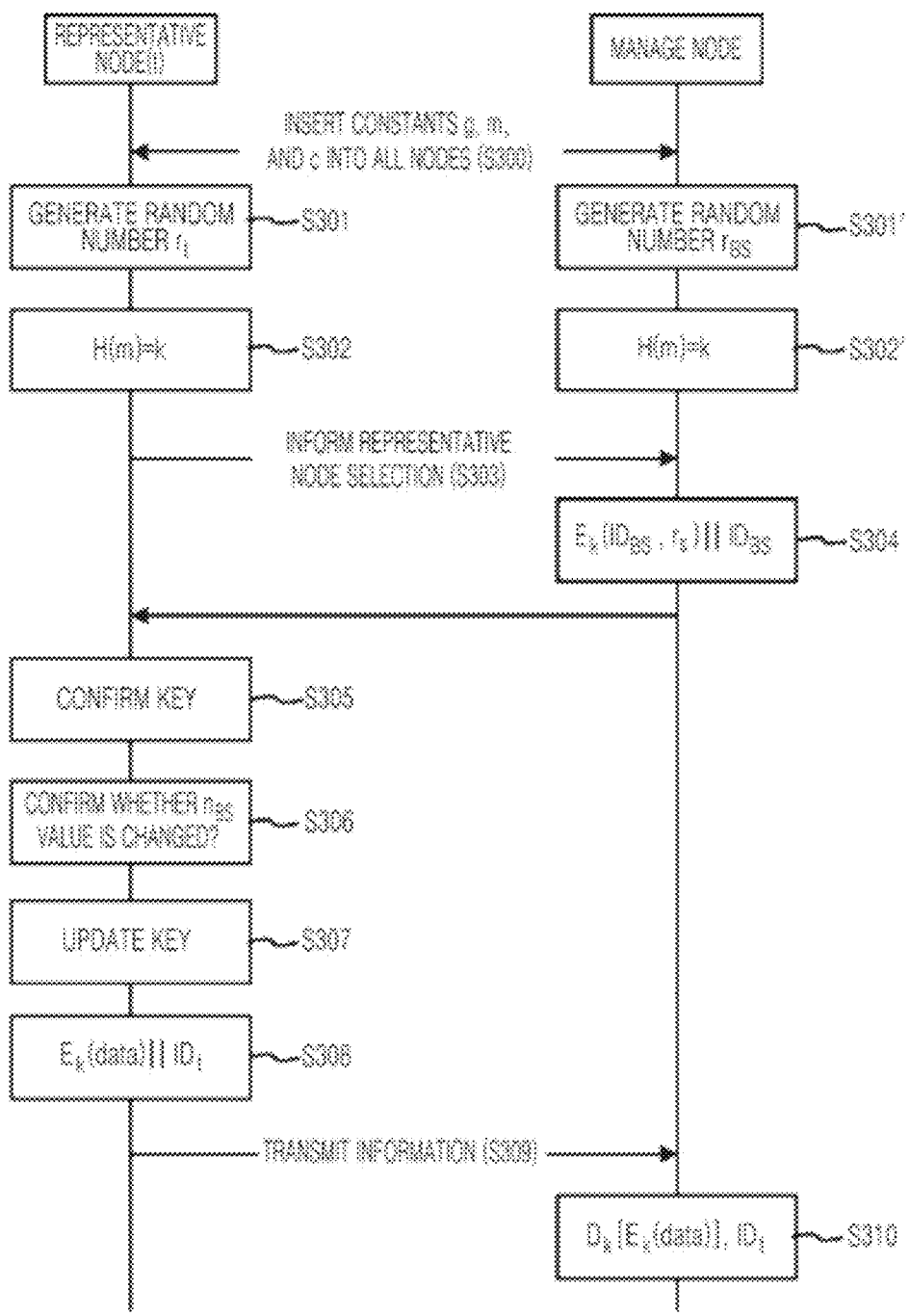
FIG. 4 is a flow chart showing the symmetrical key generating process and the key updating process between representative nodes and manager nodes in the wireless sensor networks having the hierarchy structure according to the exemplary embodiment of the present invention.

FIG. 4 is a flow chart showing the symmetrical key generating process and the key updating process between representative nodes and manager nodes in the wireless sensor networks having the hierarchy structure according to the exemplary embodiment of the present invention.

As shown in FIG. 4, the symmetrical key generating process and the key updating process according to the exemplary embodiment of the present invention are as follows. For generating the symmetrical key generation and updating the key between the representative node and the manager node, the constants g, m, and c are inserted into all the nodes (S300). In this case, g and m are any constant required to generate the keys and c is a constant for a period. These constants are inserted at the time of the system design or each time the system is updated.

When all the nodes into which the constants are inserted are distributed, each of all the nodes generates their own random numbers (S301 and S301'). In this case, when the random numbers generated by all the nodes have different values for each node, the method for generating random numbers is known in advance and therefore, the detailed description thereof will be omitted in the exemplary embodiment of the present invention.

Further, the nodes generate the random number exchanging key to be used when the temporary keys are transmitted and received between the nodes (S302 and S302'). In this case the constant m inserted prior to the node distribution is used. The random number exchanging key is generated through H (m)=k and H (•) means the hash function.

When the manager node 100 selects the representative node 200 among any nodes, the corresponding node selected by the representative node 200 informs that the selected corresponding node is the representative node, including the information coded with its own ID information $ID_t$ and its own random number $r_t$) with the random number exchanging key (S303). The manager node 100 decodes the information received at S303 with the random number exchanging key to confirm the ID information and the random number of the representative node 200.

Next, the manger node 100 generates the temporary key to be used when the manager node 100 communicates with the representative node 200. In this case, the temporary key uses the random number of the representative node 200 and the random number of the manager node to be generated as $K=g^{r_r r_{BS}}$ mod m. Further, the key to be transmitted to the representative node is generated as $K_r=g^{r_{BS}}$ mod m excluding the random number of the representative node.

The temporary key generated as described above is coded with the random number exchanging key (S304) and is then transmitted to the representative node. The representative node 200 receiving the information coded with the random number exchanging key from the manager node 100 decodes the coded information with the random number exchanging key to confirm the symmetrical key to be used when communicating with the manger node 100 (S305).

After the symmetrical key is confirmed at S305, the representative node 200 confirms whether the key update value out of the group, the $n_{BS}$ value is changed prior to communicating with the manager node 100 (S306). If the $n_{BS}$ value is changed, the representative node 200 update the symmetrical key to be used for communication using the hash function to generate a new symmetrical key (S307). The nodes participate in communication using the generated symmetrical key. That is, the information including the data and the ID information for the representative node 200 is coded with the symmetrical key (S308) and the coded information is transmitted to the representative node 200 (S309).

However, when the $n_{BS}$ value is not changed, the currently used symmetrical key is continuously maintained. In this case, the key update value $n_{BS}$ out of the group is calculated like $n_{BS}=[N_{BS}/c]$. Wherein the $N_{BS}$ represents a frequency in which the representative node 200 performs the communication out of the group with the member node, c is reference information indicating whether the key is updated based on how much the amount of communication is and is variously changed according to the system design.

When the information is received from the member node at S309, the manager node 100 decodes the coded information using its own key and then, confirms the data in the decoded information (S316) to detect the information transmitted from the representative node 200.

As described above, the exemplary embodiments of the present invention can update the symmetrical keys used by the representative nodes and the general nodes and the symmetrical keys used by the representative nodes and the manager nodes for each predetermined period through the symmetrical key updating process using the hash function using the keys when the amount of communication exceeds the predetermined frequency as a result of confirming the amount of communication between the sensor nodes so as for the sensors participating in communication in the wireless sensor networks having the hierarchy structure to update the symmetrical keys to be used, thereby increasing the security of the wireless sensor networks.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for updating keys used for inter-node information transmission in a network environment where nodes in the network environment are hierarchically related, said network environment comprising:
    a manager node residing at a highest-level of the network hierarchy, the manager node comprising a processor having a random number generator, a network interface means, and a non-transitory storage,
    a representative node residing at a level lower on the network hierarchy than the manager node, the representative node comprising a processor having a random number generator, a network interface means, and a non-transitory storage, and
    a plurality of general nodes residing at a level lower on the network hierarchy than the representative node, wherein each general node comprises a processor having a random number generator, a network interface means, and a non-transitory storage,
    the method for updating keys comprising the steps of:
        performing a first communication between the representative node and the general nodes using their respective network interface means, and also performing a second communication between the manager node and the representative node using their respective network interface means;
        generating a manager node random number for the manager node using the random number generator of the manager node,
        generating a representative node random number for the representative node using the random number generator of the representative node, and
        generating a plurality of general node random numbers for each general node of the plurality of general nodes, said plurality of general node random numbers comprising one general node random number from each general node, respectively, and the one general node random number from each general node generated using the respective random number generator of each respective general node;
        generating a first symmetrical key and a second symmetrical key based on the manager node random number, the representative random number and the plurality of general node random numbers, and storing the first symmetrical key and the second symmetrical key in node storage, wherein the node storage is a non-transitory storage medium;
        calculating a first key update value according to the first communication and updating the first symmetrical key used for the first communication when the first key update value is changed, resulting in an updated first symmetrical key;
        calculating a second key update value according to the second communication and updating the second symmetrical key used for the second communication when the second key update value is changed, resulting in an updated second symmetrical key; and
        performing the first communication using the updated first symmetrical key, and performing the second communication using the updated second symmetrical key.

2. The method of claim 1, wherein the generating of the first symmetrical key includes:
    generating the first symmetrical key for the first communication by allowing the representative node to use the representative node random number generated in the representative node random number generator and also the plurality of general node random numbers generated in each random number generator of each general node, respectively; and
    generating the second symmetrical key for the second communication by allowing the manager node to use the manager node random number and the representative node random number.

3. The method of claim 2, wherein the generating of the symmetrical key for the first communication includes:

generating a random number exchanging key using a hash function and constants inserted into the representative node and the plurality of general nodes;

coding ID information of the general nodes and the plurality of general node random numbers using the random exchanging key by the general nodes receiving the representative node selection information from the representative node;

transmitting the coded ID information and the plurality of general node random numbers to the representative node, being included in a coupling signal;

obtaining the plurality of general node random numbers using the random number exchanging key by the representative node receiving the coupling signal;

generating a temporary key of the general nodes using the obtained plurality of general node random numbers and coding the temporary key with the random number exchanging key and transmitting the coded temporary key to the general nodes; and decoding the temporary key, using the random number exchanging key to obtain the temporary key, and then generating the symmetrical key for the first communication key using the temporary key, by the general node receiving the coded temporary key.

4. The method of claim 2, wherein the generating of the symmetrical key for the second communication includes:

generating a random number exchanging key using a hash function and constants inserted into the representative node and the manager node;

coding the representative node random number, the plurality of general node random numbers, and ID information generated by the representative node, using the random exchanging key;

transmitting the coded representative node random number, the coded plurality of general node random numbers, and the coded ID information generated by the representative node, to the manager node, wherein said transmitting is included with the transmission of the representative node selection information, by the representative node;

decoding the coded representative node random number included in the representative node selection information using the random number exchanging key by the manager node to obtain the decoded representative node random number;

obtaining the plurality of general node random numbers using the random exchanging key by the representative node receiving the coupling signal;

generating a temporary key of the representative node using the representative node random number by the manager node and coding the temporary key with the random number exchanging key and transmitting the coded temporary key to the representative node; and decoding the temporary key using the random number exchanging key to obtain the temporary key, and then generating the symmetrical key for the second communication key using the temporary key, by the representative node receiving the coded temporary key.

5. The method of claim 1, wherein the first key update value is a function of:

a frequency in which the representative node communicates with a member node, a frequency in which the representative node communicates with the general node, and a predetermined reference amount of communication for updating the key, and wherein, the second key update value is updated based on a frequency in which the representative node communicates with the manager node and a predetermined reference amount of communication for updating the key.

6. A method for updating keys used for an inter-node information transmission in a network environment where nodes in the network are hierarchically related, the network environment comprising:

a representative node comprising a processor comprising a representative node random number generator, a network communication means, and a non-transitory storage medium, and a plurality of general nodes residing at a hierarchical level lower than the representative node where each general node comprises a processor having a general node random number generator, a network communication means, and a non-transitory storage;

the method for updating keys comprising the steps of:

generating a representative node random number using the representative node random number generator, and generating a plurality of general node random numbers using each general node random number generator, respectively;

transmitting a coupling signal for managing the general nodes as a member node of the representative node to the representative node network communication means;

generating a temporary key for the general nodes transmitting the coupling signal by the representative node and transmitting the generated temporary key to the general nodes, by including the generated temporary key in scheduling information;

calculating a symmetrical key from the temporary key and calculating a key update value for transmitting data to the representative node by the general nodes receiving the scheduling information including the temporary key; and updating the calculated symmetrical key and transmitting data to the representative node using the updated symmetrical key by the general node when the key update value is changed.

7. The method of claim 6, wherein the step of generating of the representative node random number further comprises transmitting representative node selection information to the plurality of general nodes by a representative node selected as the representative node from the plurality of general nodes.

8. The method of claim 6, wherein the transmitting of the coupling signal codes ID information of a general node transmitting the coupling signal and the random number generated by the general node and transmits the coded ID information and the random number of said general node to the representative node.

9. The method of claim 8, wherein the generated temporary key is generated using the random numbers of the remaining general nodes other than the random number generated by the general node transmitting the coupling signal.

10. The method of claim 6, wherein the key update value is updated based on a frequency in which the representative node communicates with the member node, the general node and a predetermined reference amount of communication for updating the key.

11. A method for updating keys used for an inter-node information transmission in a network environment where nodes in the network are hierarchically related, the network environment comprising:

a representative node comprising a processor having a random number generator, a non-transitory storage, and a network communication means, and a manager node at a hierarchical level above the representative node, the manager node comprising a processor having a manager node random number generator, a non-transitory storage, and a network communication means;

the method for updating keys comprising:

generating a representative node random number using the representative node random number generator;

generating a manager node random number using the manager node random number generator;

transmitting representative node selection information to the manager node by the representative node using the representative node network communication means, the representative node selection information comprising representative node ID information and the representative node random number;

generating a temporary key for the representative node and transmitting the generated temporary key to the representative node based on the random number of the representative node included in the representative node selection information by the manager node;

calculating a symmetrical key from the temporary key and calculating a key update value for transmitting data to the manager node; and updating the calculated symmetrical key and transmitting the data to the manager node using the updated symmetrical key by the representative node when the key update value is changed.

12. The method of claim 11, wherein the key update value is updated based on a frequency in which the representative node communicates with the manager node and a predetermined reference amount of communication for updating the key.

13. The method of claim 11, wherein the generated temporary key is generated using the representative node random number.

14. The method of claim 11, wherein the generating of the random number includes generating the representative node and the manager node generates the random exchanging key using a hash function and constants inserted into the representative node and the manager node, respectively.

* * * * *